G. H. ALEXANDER.
APPLIANCE FOR THE CUTTING OR FORMING OF SCREW THREADS.
APPLICATION FILED NOV. 13, 1915.
1,196,503.
Patented Aug. 29, 1916.
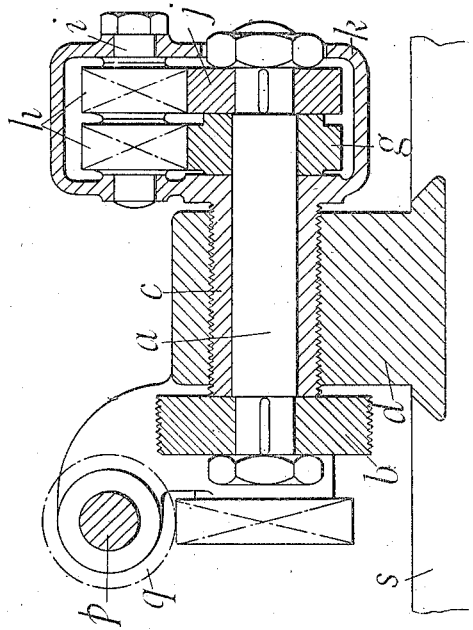
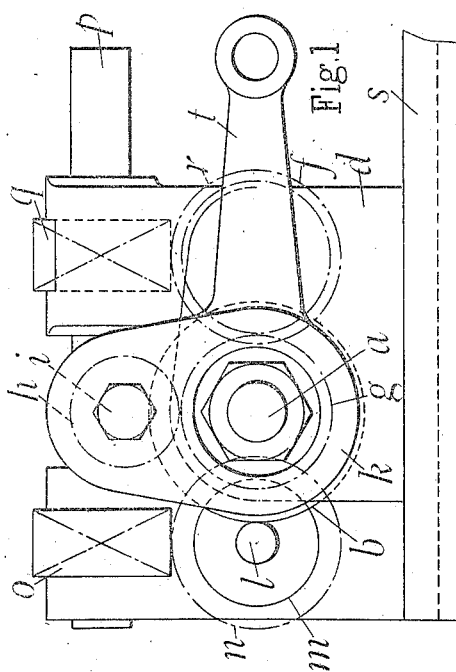
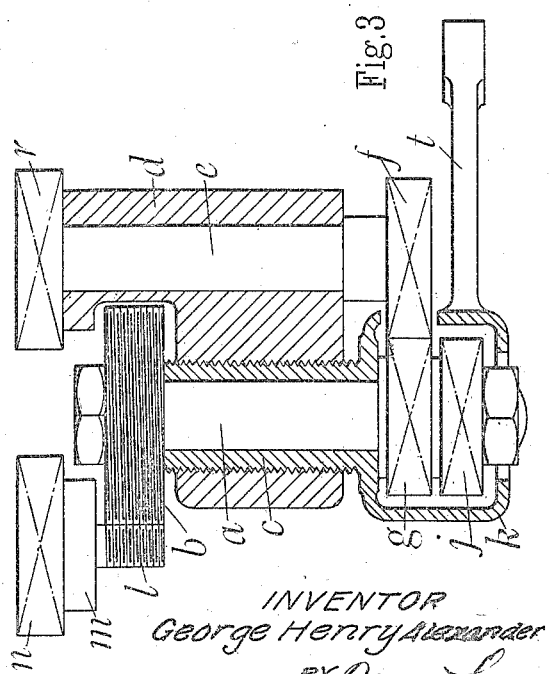
INVENTOR
George Henry Alexander
BY Munn & Co
ATTORNEYS

UNITED STATES PATENT OFFICE.

GEORGE HENRY ALEXANDER, OF BIRMINGHAM, ENGLAND.

APPLIANCE FOR THE CUTTING OR FORMING OF SCREW-THREADS.

1,196,503.   Specification of Letters Patent.   Patented Aug. 29, 1916.

Application filed November 13, 1915. Serial No. 61,379.

*To all whom it may concern:*

Be it known that I, GEORGE HENRY ALEXANDER, subject of the King of Great Britain, residing at Doe street, in the city of Birmingham, England, have invented certain new and useful Improvements Relating to Appliances for the Cutting or Forming of Screw-Threads, of which the following is a specification.

This invention relates to appliances for the cutting or forming of screw threads, and has for its object to construct an improved appliance of the type in which a rotating screw threaded cylindrical tool is adapted to produce the required thread when advanced on to the work in a direction at right angles to the axis about which the work rotates. In such appliances the tool is usually several times larger in diameter than the work and in all cases is driven at a fixed speed relatively to the work. Thus, when a single-start thread is employed on the tool, the tool and work are driven at the same speed in the same directions. When a two-start thread is employed on the tool for cutting a single-start thread on the work the tool is rotated at half the speed of the work. In actual practice it is found that difficulty is encountered in producing a screw thread which is perfectly free from peripheral flats or facets. By this invention the said defect is avoided.

The invention comprises the employment of means whereby an angular movement or partial rotation can be imparted to the tool relatively to or independently of the work and simultaneously an axial movement of the tool whereby the correct relationship is maintained between the threads on the tool and work piece.

Referring to the accompanying sheet of explanatory drawings:—Figure 1 is an end elevation, Fig. 2 a sectional front elevation and Fig. 3 a sectional plan showing diagrammatically a screw cutting apparatus constructed in accordance with this invention.

A spindle $a$ carrying the screw cutting tool $b$ is mounted in a bush $c$ which is externally screw threaded and supported in a bracket $d$. The bracket also carries another spindle $e$ on which is secured a gear wheel $f$ meshing with another wheel $g$ which rotates idly on the tool spindle. From the wheel $g$ motion is taken through a pair of pinions $h$ on a countershaft $i$ to another pinion $j$ which is fixed on the tool spindle $a$. The said countershaft is carried in a case $k$ which is formed with or attached to one end of the screwed bush $c$ above mentioned. Any suitable connection is provided between the gear wheels and the rotating work piece for maintaining a fixed speed ratio between the work piece and the tool. In the arrangement shown the work piece $l$ is carried in a chuck $m$ with which is arranged a spiral wheel $n$ gearing with a like wheel $o$. On the spindle $p$ of the latter is mounted a spiral wheel $q$ which is feather-keyed to the spindle so that it can slide thereon. Motion is transmitted to the spindle $e$ from the wheel $q$ through a similar wheel $r$. The direction of the spiral teeth on $q$ and $r$ is opposite to that of $n$ and $o$ so that the wheel $r$ rotates in the opposite direction to the wheel $n$. It will be understood that rotary motion is imparted to the chuck $m$ in any ordinary manner.

By any convenient provision the bracket $d$ carrying the tool $b$ and the parts above mentioned are adapted to be moved in a direction at right angles to the axis of the work piece. Thus as shown the bracket is arranged to slide on the bed $s$ of the machine and the required sliding motion can be imparted by a screw, cam, or other mechanism. During the thread forming operation the gear case $k$ on the screwed bush $c$ is rotated through a suitable (and usually small) angular distance by means of a lever $t$ which may be actuated by hand or by any suitable cam or other mechanism. During such movement the gear wheels operate as an epicyclic system and produce an angular movement of the tool relatively to or independently of the work. At the same time a slight axial movement is imparted to the bush and consequently to the tool (by reason of the screw thread on the bush) so that the required relationship is maintained between the threads on the tool and work piece.

Instead of producing the required axial movement of the tool by a screw thread on the bush one end of the tool spindle may be acted upon by a cam or other equivalent device.

By this invention accurate and well finished screw threads can be produced very expeditiously and at small cost.

Having thus described my invention what I claim as new and desire to secure by Letters Patent is:—

1. In appliances for producing screw threads, the combination with a rotary screw threaded cylindrical tool arranged to coact with a rotating work piece and adapted to produce the thread when engaged with the work piece by a movement at right angles to the axis of the work piece, of means for imparting to the tool a partial rotation independently of the work piece and simultaneously an axial movement whereby the correct relationship is maintained between the threads on the tool and work piece, substantially as set forth.

2. In appliances for producing screw threads, the combination with a rotary screw threaded cylindrical tool arranged to coact with a rotating work piece and adapted to produce the thread when engaged with the work piece by a movement at right angles to the axis of the work piece, of a screwed bearing for the tool, and means for imparting to the tool a partial rotation independently of the work piece, and to the bearing a partial rotation which produces an axial movement of the tool, substantially as set forth.

3. In appliances for producing screw threads, the combination with a rotary screw threaded cylindrical tool arranged to coact with a rotating work piece and adapted to produce the thread when engaged with the work piece by a movement at right angles to the axis of the work piece, of a tool spindle, an externally screwed bush carrying the spindle, a fixed internally screwed bearing for the said bush, a fast and a loose pinion on the spindle, an intermediate connecting gear carried on one end of the bush, and means for imparting a partial rotation to the bush, substantially as set forth.

4. In appliances for producing screw threads, the combination with a rotary screw threaded cylindrical tool arranged to coact with a rotating work piece and adapted to produce the thread when engaged with the work piece by a movement at right angles to the axis of the work piece, of a tool spindle, an externally screwed bush carrying the spindle, a fixed internally screwed bearing for said bush, a driving spindle arranged in said bearing parallel with the tool spindle, a fixed and a loose pinion on the tool spindle, a fixed pinion on the driving spindle, the latter pinion gearing with the loose pinion on the tool spindle, an intermediate pinion connecting the fixed and loose pinions on the tool spindle and carried on one end of the screwed bush, and a lever whereby a partial rotation can be imparted to the bush, substantially as set forth.

In testimony whereof I have signed my name to this specification.

GEORGE HENRY ALEXANDER.